United States Patent
Zhang et al.

(10) Patent No.: US 11,778,535 B2
(45) Date of Patent: Oct. 3, 2023

(54) ACCESS CONTROL METHOD AND USER EQUIPMENT

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN); Shohei Yamada, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 341 days.

(21) Appl. No.: 17/264,770

(22) PCT Filed: Jul. 23, 2019

(86) PCT No.: PCT/CN2019/097255
§ 371 (c)(1),
(2) Date: Jan. 29, 2021

(87) PCT Pub. No.: WO2020/024847
PCT Pub. Date: Feb. 6, 2020

(65) Prior Publication Data
US 2021/0297931 A1    Sep. 23, 2021

(30) Foreign Application Priority Data

Jul. 31, 2018    (CN) .......................... 201810859584.6

(51) Int. Cl.
*H04W 48/02* (2009.01)
*H04W 48/20* (2009.01)

(52) U.S. Cl.
CPC ........... *H04W 48/02* (2013.01); *H04W 48/20* (2013.01)

(58) Field of Classification Search
None
See application file for complete search history.

(56) References Cited

U.S. PATENT DOCUMENTS 10,638,487 B2 *  4/2020  Babaei ................. H04W 76/11
11,483,896 B2 * 10/2022  Jin ....................... H04W 48/08
(Continued)

FOREIGN PATENT DOCUMENTS

| CN | 103201977 A | 7/2013 |
| CN | 104885546 A | 9/2015 |

(Continued)

OTHER PUBLICATIONS

OPPO. "Another option for duplication control using MAC CE" 3GPP TSG-RAN2 #102 R2-1807539, May 25, 2018 (May 25, 2018), main body, sections 1-3.

(Continued)

*Primary Examiner* — Hong S Cho
(74) *Attorney, Agent, or Firm* — ScienBiziP, P.C.

(57) ABSTRACT

Provided by the present disclosure are an access control method in a user equipment and the user equipment, which may flexibly control the activation and deactivation of PDCP duplication and the activation and deactivation of a serving cell restriction. The access control method comprises: receiving configuration information related to a data radio bearer (DRB); receiving a media access control element (MAC CE) indicating the activation/deactivation of a packet data convergence protocol layer (PDCP) duplication function of the DRB; when the MAC CE indicates the deactivation of the PDCP duplication function, determining whether the configuration information comprises indication information, the indication information indicating a restriction relationship between a logical channel associated with the DRB and a serving cell which is allowed to be used; and (Continued)

determining a serving cell used for the logical channel according to the result of the determination.

10 Claims, 5 Drawing Sheets

(56) References Cited

U.S. PATENT DOCUMENTS

| | | | |
|---|---|---|---|
| 2018/0098250 A1 | 4/2018 | Vrzic et al. | |
| 2018/0199315 A1 | 7/2018 | Hong et al. | |
| 2018/0368107 A1* | 12/2018 | Babaei | H04L 1/1838 |

FOREIGN PATENT DOCUMENTS

| | | |
|---|---|---|
| CN | 107147479 A | 9/2017 |
| CN | 107637001 A | 1/2018 |
| CN | 108282823 A | 7/2018 |
| RU | 2644412 C2 | 2/2018 |
| WO | 2016168342 | 10/2016 |
| WO | 2017/204539 A1 | 11/2017 |
| WO | 2018/084760 A1 | 5/2018 |
| WO | 2018130968 A | 7/2018 |

OTHER PUBLICATIONS

Ericsson, LCP restrictions for duplication and non-duplication, 3GPP TSG-RAN WG2 AH 1807, Montreal, Canada, Jul. 2-6, 2018, R2-1810180, the whole document.

3GPP TS 38.321 V15.2.0 (Jun. 2018), 3rd Generation Partnership Project, Technical Specification Group Radio Access Network, NR, Medium Access Control (MAC) protocol specification(Release 15), 38321-F20, paragraph [5.4.3.1.1]-paragraph [5.4.3.1.2], paragraph [q.5.10], paragraph [b.6.1.2].

ASUSTeK, "Remaining MAC issues on PDCP duplication", 3GPP TSG-RAN WG2 Meeting #101bis Sanya, China, Apr. 16-20, 2018, R2-1804281.

\* cited by examiner

ACCESS CONTROL METHOD AND USER EQUIPMENT

FIELD

The present disclosure generally relates to wireless communications, and specifically, to access control methods for user equipment, and corresponding base stations and user equipment.

BACKGROUND

As mobile communication grows and its technology improves, the world is moving into a community that is a completely interconnected network and that is where anyone or anything can obtain information and share data at anytime and anywhere. It is estimated that there are 50 billion devices that are interconnected in 2020, and among those devices, only 10 billion devices are mobile phones and tablet computers. The rest are devices not communicating between humans but between each other. Therefore, how to design a system that better supports networks connecting all things requires more in-depth study and research.

Studies of the new 5G radio access technology were performed (referring to a non-patent publication: RP-160671 New SID Proposal: Study on New Radio Access Technology) in the #64 plenary meeting for RAN of the 3rd generation partnership program (3GPP) held in March 2016. In the work item, it is disclosed that frequency ranges in the future communication protocol may be expanded to 100 GHz while meeting the requirements of enhanced Mobile Broadband (eMBB), massive Machine-Type Communication (mMTC), and Ultra-Reliable and Low-Latency Communication (URLLC). The work item will be ended in 2018.

In NR systems, a packet data convergence protocol layer (PDCP) duplication is a function in the PDCP layer. The function allows the PDCP to generate two identical PDU from one SDC, transmit the two PDU to different RLC entities, and send to the MAC layer via different logical channels. Since the logical channels used for sending the two PDU are configured with different serving cells, the restriction relationships exist between the logical channels and the serving cells. Therefore, in the MAC layer, the two PDU are sent via different serving cells, so that receiver gain is realized.

In present mechanisms, the activation/deactivation of the PDCP duplication is tied in with the restrictions of serving cells. When the PDCP duplication is activated, the two corresponding logical channel of the DRB uses respective serving cells that are configured and allowed to be used for data transmission. When the PDCP duplication is deactivated, the two corresponding logical channels of the DRB does not have restrictions of serving cells and is able to transmit data on all serving cells.

Considering the PDCP duplication function are configured for some of the DRB, and some of the DRB are only configured with the restriction function of the serving cells. The problems needs to be solved is in how to flexibly control the activation and deactivation of the PDCP duplication and the activation and deactivation of the serving cell restrictions.

SUMMARY

The present disclosure provides an access control method in a user equipment and the user equipment that may flexibly control the activation and deactivation of PDCP duplication and the activation and deactivation of a serving cell restriction.

According to a first aspect of the present disclosure, there is provided an access control method in a user equipment (UE), the method comprising: receiving configuration information related to data radio bearer (DRB); receiving a media access control element (MAC CE) indicating an activation/deactivation of a packet data convergence protocol layer (PDCP) duplication function of the DRB; when the MAC CE indicates the deactivation of the PDCP duplication function, determining whether the configuration information comprises indication information, the indication information indicating a restriction relationship between a logical channel associated with the DRB and a serving cell which is allowed to be used; and determining a serving cell used for the logical channel according to a result of the determination.

In the above control method, optionally, wherein, when the result of the determination is that the configuration information includes the indication information, for the logical channel, use the serving cell which is allowed to be used and configured to the logical channel; when the result of the determination is that the configuration information does not include the indication information, for the logical channel, do not use the serving cell which is allowed to be used and configured to the logical channel.

In the above control method, optionally, when the result of the determination is that the configuration information includes the indication information, determine the serving cell used for the logical channel according to a value of the indication information.

In the above control method, optionally, the logical channel associated with the DRB include a plurality of logical channels, for each logical channel, determining a serving cell used for the logical channel according to the result of the determination.

According to a second aspect of the present disclosure, there is provided an access control method in a user equipment (UE), the method comprising: receiving configuration information related to data radio bearer (DRB); a plurality of logical channels related to the DRB including a first logical channel and a second logical channel, the configuration information including first indication information indicating a first logical channel ID, receiving a media access control element (MAC CE) indicating an activation/deactivation of a packet data convergence protocol layer (PDCP) duplication function of the DRB, and when the MAC CE indicates the deactivation of the PDCP duplication function; for the first logical channel, in addition to using the serving cell which is allowed to be used and configured to the first logical channel, also using the serving cell which is allowed to be used and configured to the second logical channel.

In the above control method, optionally, the method further comprises: when receiving the MAC CE indicating the activation of the PDCP duplication function, for the first logical channel, using the serving cell which is allowed to be used and configured to the first logical channel.

In the above control method, optionally, the method further comprises: determining whether the configuration information comprises second indication information, the second indication information indicating a restriction relationship between a logical channel associated with the DRB and a serving cell which is allowed to be used; when the MAC CE indicates the deactivation of the PDCP duplication function and a result of the determination is that the configuration information includes the second indication information, for the first logical channel, in addition to using the serving cell which is allowed to be used and configured to the first logical channel, also using the serving cell which is allowed to be used and configured to the second logical channel.

According to a third aspect of the present disclosure, there is provided an access control method in a user equipment (UE), the method comprising: receiving configuration information related to data radio bearer (DRB), the configuration information including first indication information and second indication information for each logical channel related to the DRB, wherein the first indication information indicates the serving cell which is allowed to be used when a packet data convergence protocol layer (PDCP) duplication function is activated, the second indication information indicates the serving cell which is allowed to be used when the PDCP duplication function is deactivated; receiving a media access control element (MAC CE) indicating the activation/deactivation of the PDCP duplication function of the DRB; and when the MAC CE indicates the activation of the PDCP duplication function, for the logical channel, using the serving cell of the first indication information; when the MAC CE indicates the deactivation of the PDCP duplication function, for the logical channel, using the serving cell of the second indication information.

According to a fourth aspect of the present disclosure, there is provided an access control method in a user equipment (UE), the method comprising: receiving configuration information, the configuration information including a restriction relationship between each logical channel of the UE and a serving cell which is allowed to be used; receiving a media access control element (MAC CE), the MAC CE including, for each logical channel, information indicating an activation/deactivation of the restriction relationship; and determining a serving cell used for each logical channel according to the information.

According to a fifth aspect of the present disclosure, there is provided a user equipment, comprising: a processor; and a memory storing instructions; wherein, the instructions, when executed by the processor, performs an access control method according to any one of the above methods.

Effects of the Invention

The access control method in a user equipment and the user equipment according to the present disclosure may flexibly control the activation and deactivation of PDCP duplication and the activation and deactivation of a serving cell restriction.

BRIEF DESCRIPTION OF THE DRAWINGS

Aspects of the present disclosure are best understood from the following detailed description when read with the accompanying figures.

DESCRIPTION

The following descriptions and accompanying drawings contain detailed descriptions of exemplary implementations of the present disclosure. It should be appreciated that the present disclosure is not limited to the implementations disclosed herein. Additionally, for the ease of understanding, the descriptions do not include detailed descriptions of general knowledge not directly related to the present disclosure in order to avoid confusion of the present disclosure.

Prior to detailed descriptions of the implementations, the following paragraphs defines the terms used in the present disclosure. Unless otherwise specified, the terms in the present disclosure contain the following meanings.

UE User Equipment
NR New Radio
eLTE Enhanced Long Term Evolution
NAS Non-Access Stratum
AS Access Stratum
SDU Service Data Unit
PDU Protocol Data Unit
MAC Medium Access Control
RLC Radio Link Control
PDCP Packet Data Convergence Protocol
RRC Radio Resource Control
MAC CE MAC Control Element The following paragraphs describes implementations applied in NR mobile communications systems and a progression environment. Base stations and UE supporting NR are used as examples to describe various implementations of the present disclosure. However, it should be noted that the present disclosure is not limited to the following implementations. The present disclosure is suitable for various other radio communications systems, such as an eLTE communications system. The present disclosure is also applicable to other base stations and UE, for example, the base stations and UE supporting eLTE. The eLTE communications systems disclosed herein refers to a UE communicating with a base station via air interface using the LTE mode, but the UE NAS connecting to a 5G core network not EPC.

PDCP Duplication

PDCP duplication is a function realized in PDCP layer. The function allows the PDCP to generate two identical PDU from one SDC, transmit the two PDU to different RLC entities, and send to the MAC layer via different logical channels. Since the logical channels used for sending the two PDU are configured with different serving cells, the restriction relationships exist between the logical channels and the serving cells. Therefore, in the MAC layer, the two PDU are sent via different serving cells, so that receiver gain is realized.

When establishing a DRB, the configuration information of the DRB includes at least the DRB ID and the PDCP config corresponding to the DRB. For realizing the above PDCP duplication function, the configuration information of the PDCP layer corresponding to the DRB includes the following information:

moreThanOneRLC SEQUENCE {
  primaryPath SEQUENCE {
    cellGroup CellGroupId OPTIONAL, —Need R
    logicalChannel LogicalChannelIdentity OPTIONAL
      —Need R
  [Article 26 Amendment Submitted on 21 Aug. 2019]
  }, ul-DataSplitThreshold UL-DataSplitThreshold
   OPTIONAL, —Cond SplitBearer
pdcp-Duplication BOOLEAN OPTIONAL —Need R
} OPTIONAL, —Cond MoreThanOneRLC Wherein, the cell pdcp-Duplication indicates whether the PDCP is configured with the duplication function. When the value is TRUE, it indicates the PDCP duplication function is configured or activated. Otherwise, when the value is FALSE, it indicates the PDCP duplication is deactivated/disabled.

When the value of pdcp-Duplication is TRUE, the DRB associated with the PDCP may be called a PDCP duplication configured DRB, or may be called a DRB configured with PDCP duplication function.

The cell primaryPath includes logical channel ID information. When the PDCP duplication is deactivated or disabled, the UE performs data transmission via the logical channel indicated in the primaryPath. The logical channel indicated in the primaryPath may be called the logical channel associated with or corresponding to the primaryPath.

The cell primaryPath includes cellGroup ID information for indicating the serving cells belong to the logical channel in the primaryPath, which may be MCG or SCG.

For supporting the above disclosed PDCP duplication function, the RLC-BearerConfig associated with the DRB includes the following information:

[Article 26 Amendment Submitted on 21 Aug. 2019]
RLC-BearerConfig::=SEQUENCE {
logicalChannelIdentity LogicalChannelIdentity,
servedRadioBearer CHOICE {
   srb-Identity SRB-Identity,
   drb-Identity DRB-Identity
   } OPTIONAL, —Cond LCH-SetupOnly
reestablishRLC ENUMERATED {true} OPTIONAL, —Need R
rlc-Config RLC-Config OPTIONAL, —Cond LCH-Setup
mac-LogicalChannelConfig LogicalChannelConfig
   OPTIONAL, —Cond LCH-Setup
. . .
}

Wherein the cell logicalChannelIdentity indicates a logical channel ID corresponding to the RLC.

The cell servedRadioBearer indicates a DRB ID associated with the RLC.

The cell mac-LogicalChannelConfig indicates a MAC configuration of a logical channel corresponding to the RLC, the specific information is:

[Article 26 Amendment Submitted on 21 Aug. 2019]
LogicalChannelConfig::=SEQUENCE {
allowedServingCells SEQUENCE (SIZE (1 . . . maxNrofServingCells–1)) OF ServCellIndex
OPTIONAL, —Need R
allowedSCS-List SEQUENCE (SIZE (1 . . . maxSCSs))
   OF SubcarrierSpacing OPTIONAL, —Need R
. . .
} OPTIONAL, —Cond UL
. . .
}

Wherein, the cell allowedServingCells indicates serving cell(s) which is allowed to be used by the logical channel, and is represented by a serving cell serial number. Once the logical channel is configured with a serving cell which is allowed to be used, there exists a restriction relationship between the logical channel and the serving cell. Once the cell is configured, the data to be transmitted via the logical channel (or the data transmission related to the logical channel) can only be transmitted via the serving cell indicated in the cell. It may also be understood that, when the logical channel is configured with the serving cell which is allowed to be used, in the condition that the logical channel has the serving cell restriction, and the data related to the logical channel is to be transmitted, it can only be transmitted via the allowed serving cell. In contrast, if the serving cell restriction in not used, this means data transmission related to the logical channel may be performed via any or all serving cells usable to the UE. The any serving cells referred herein must be valid.

For example, the logical channel is allowed to use a serving cell Cell-1, and there are data to be transmitted on the logical channel. When the uplink grant (UL grant) exists, the MAC layer firstly determines the serving cell(s) this UL grant belongs to. If it belongs to a serving cell Cell-2, the data on the logical channel will not be sent. If it belongs to the serving cell Cell-1, the data on the logical channel may be sent via this UL grant. This procedure is implemented in a logical channel priority (LCP) procedure. In the LCP procedure, the MAC needs to know the information related to the restriction between the logical channel and the serving cell as disclosed above. When the UE receives a UL grant, an uplink resource is assigned for data transmission, the MAC determines whether serving cell restriction exists in the logical channel where the data to be transmitted belongs to or is associated with. If so, the MAC further determines whether the uplink resource of the current UL grant belongs to the allowed serving cell of the logical channel. Only when the UL grant resource is the resource of the serving cell which is allowed to be used by the logical channel, the UE may transmit data via the UL grant resource.

For supporting the PDCP duplication function, there are at least two RLC-BearerConfig that are associated with the same DRB. This also means, these two RLC-BearerConfig include the same DRB ID. In the two RLC-BearerConfig, each includes respective logical channel ID and respective information of the serving cell which is allowed to be used by the respective logical channel. Wherein, one logical channel ID is included in the primaryPath, and is called the logical channel corresponding to the primaryPath. The other logical channel ID is not included in the primaryPath, and this logical channel is called the logical channel not corresponding to the primaryPath. However, the two logical channel are associated with the same DRB.

When a UE is not configured with the PDCP duplication, a DRB is usually associated with a RLC-BearerConfig, which includes the ID of the DRB. This RLC-BearerConfig may include other corresponding logical channel ID(s) and information of the serving cell which is allowed to be used by the respective logical channel. In this circumstance, this DRB may be called a DRB configured with serving cell restriction, or simply a DRB configured with serving cell. This function may be called a restriction function of the logical channel and serving cell. This restriction function of the serving cell may be cancelled/deactivated, and may also be initiated/activated.

When this restriction function of the serving cell is cancelled/deactivated or not used, it means that the data transmission related to the logical channel configured with the serving cell, which is allowed to be used, may be performed on all serving cells, and is not restricted by the number of serving cells; or, transmission related to the logical channel is not limited to the serving cells in the list of the configured serving cell which is allowed to be used, it may be performed on serving cells that are not in the list.

When this restriction function of the serving cell is initiated/deactivated or being used, it means that the data transmission related to the logical channel configured with the serving cell, which is allowed to be used, may be performed on the serving cells in the list of the configured serving cell which is allowed to be used.

This serving cell restriction of transmission on the logical channel transmission may be implemented in the same manner as the restriction of the serving cell in PDCP duplication.

For example, when a logical channel X is configured with serving cell Cell-1 which is allowed to be used, there are data to be transmitted on the logical channel, and UL grant exists, for selecting which logical channels to transmit, the MAC layer firstly determines the serving cell(s) this UL grant belongs to/comes from. If it belongs to a serving cell Cell-2, the data on the logical channel X will not be sent. If it belongs to the serving cell Cell-1, the data on the logical channel may be sent via this UL grant.

In present mechanisms, the activation/deactivation of the PDCP duplication is tied in with the restrictions of serving cells. When the PDCP duplication is activated, the two corresponding logical channel of the DRB uses respective serving cells that are configured and allowed to be used for data transmission.

When the PDCP duplication is deactivated, the two corresponding logical channel of the DRB do not use respective serving cells that are configured and allowed to be used for data transmission, and are allowed to perform data transmission on all serving cells as such serving cell restrictions are released.

For the DRB configured with PDCP duplication, Implementations 1-4 propose solutions to allow flexible control of the activation and deactivation of PDCP duplication and the activation and deactivation of a serving cell restriction.

Furthermore, for the logical channel configured with serving cells, current technology may initiate or cancel this serving cell restrictions with reconfiguration information. Since the reconfiguration information is generated by the RRC layer, it cannot flexibly control the initiation or cancellation. Therefore, Implementations 5-7 propose solutions to allow flexible control of and the initiation and cancellation of a serving cell restriction. Implementations 5-7 takes further considerations of the DRB configured with PDCP duplication and the DRB that are not configured with PDCP duplication but are configured with serving cell restrictions, and propose methods to centrally control the activation and deactivation of all.

In the present disclosure, activating/deactivation may also be enabling/disabling.

In the present disclosure, an example disclosing configuring a value to 0 or 1 may be configuring to other values. The variation(s) will not be further disclosed in other repeating examples.

In the present disclosure, an example disclosing configuring a value to TRUE or FALSE may be configuring to other values. The variation(s) will not be further disclosed in other repeating examples.

The terms "related to," "associated with," and "corresponding to" are interchangeable within the present disclosure.

Figure 1:
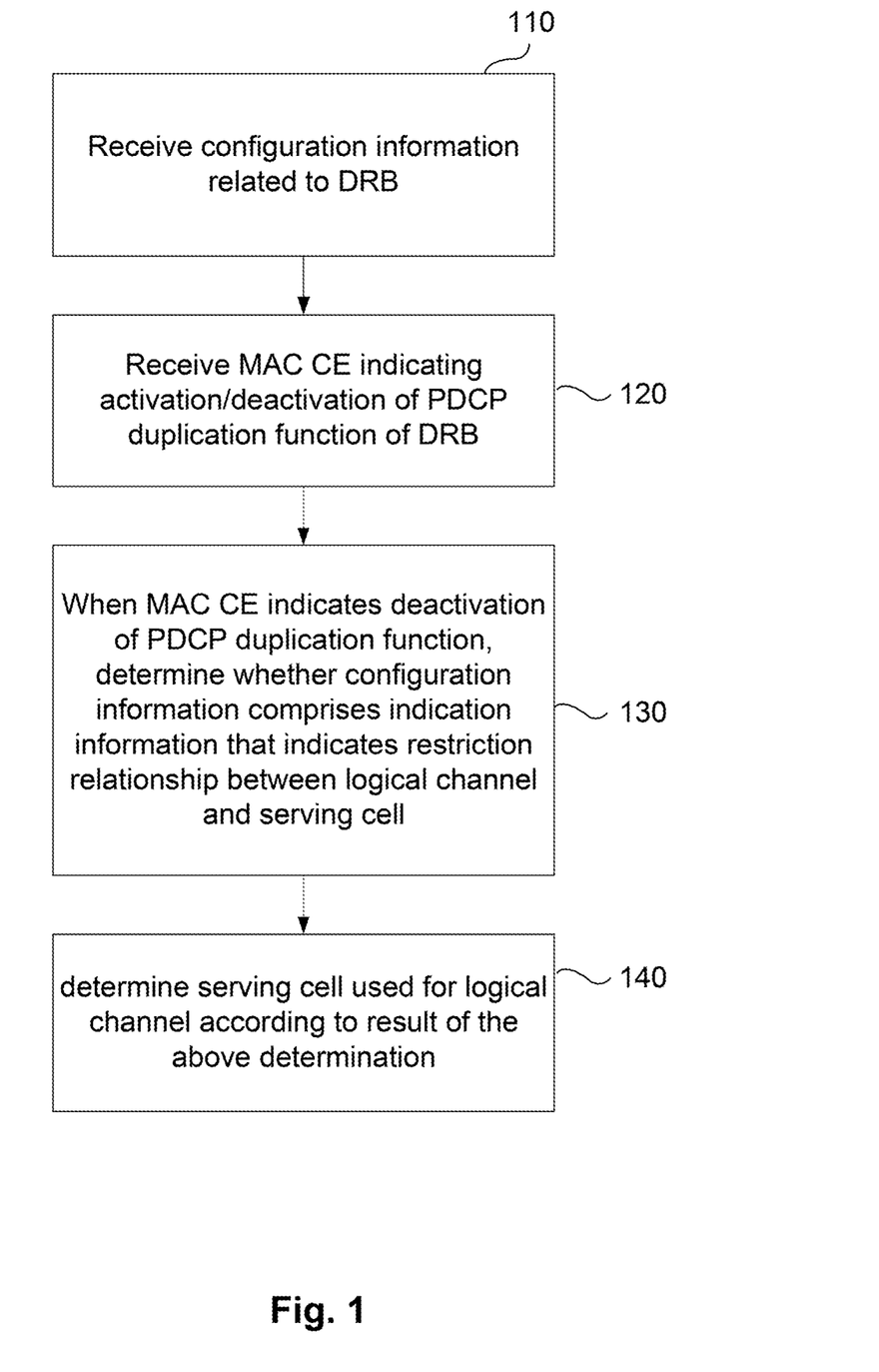
FIG. 1 is a flow chart of an access control method in a user equipment according to an implementation of the present disclosure.

FIG. 1 is a flow chart of an access control method in a user equipment according to an implementation of the present disclosure. As illustrated in FIG. 1, the access control method includes step S110, step S120, step S130 and step S140.

At step S110, the UE receives configuration information related to DRB.

At step S120, the UE receives a MAC CE indicating an activation/deactivation of the PDCP duplication function of the DRB.

At step S130, when the MAC CE indicates the deactivation of the PDCP duplication function, determining whether the configuration information comprises indication information, the indication information indicating a restriction relationship between a logical channel associated with the DRB and a serving cell which is allowed to be used.

At step S140, according to the result of the above determination, determining a serving cell used for the logical channel.

Accordingly, unlike the present mechanisms that when the PDCP duplication is deactivated the logical channel is directly allowed to use all serving cells, the above-disclosed access control method introduces indication information in the configuration information, wherein the indication information indicating a restriction relationship between a logical channel associated with the DRB and a serving cell which is allowed to be used, and determines a serving cell used for the logical channel according to whether the configuration information comprises indication information.

Therefore, according to the above-disclosed access control method, the activation and deactivation of PDCP duplication and the activation and deactivation of serving cell restrictions may be flexibly controlled.

Figure 2:
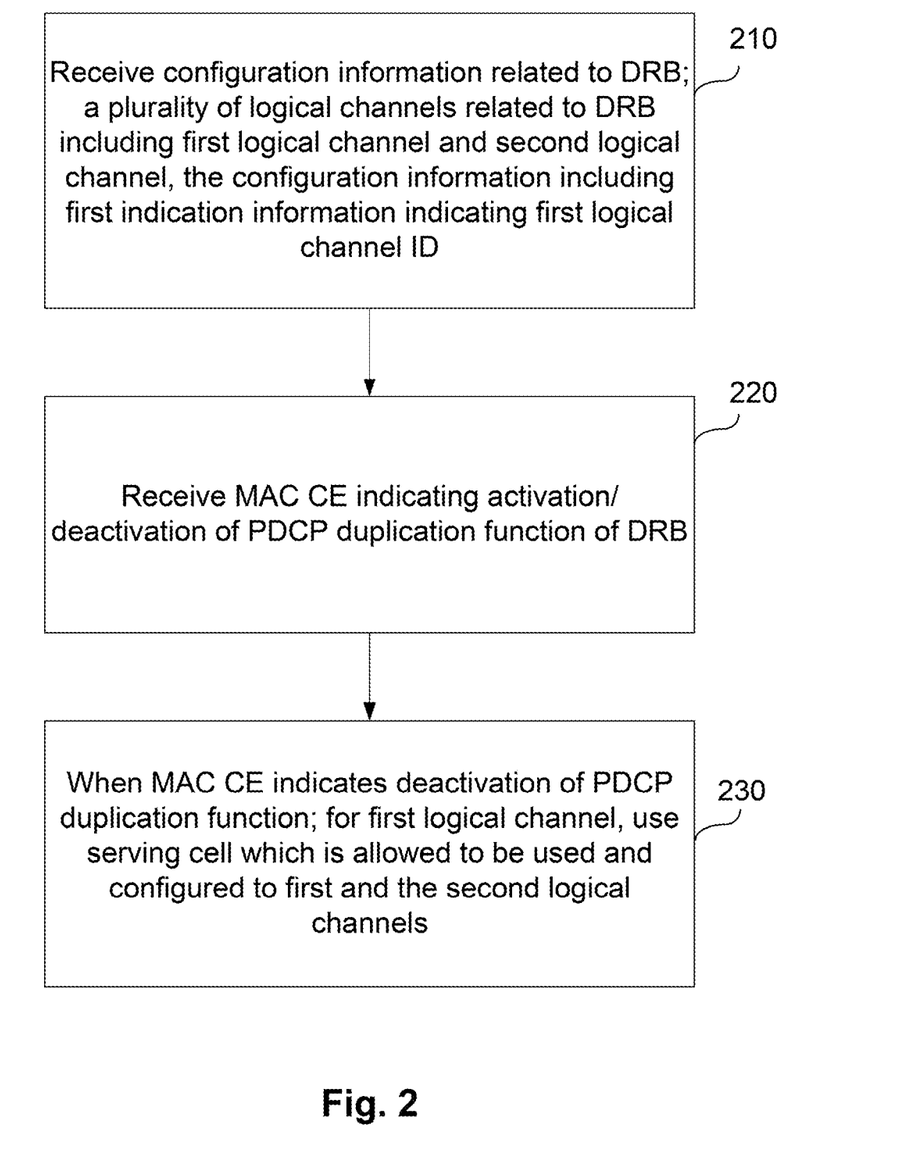
FIG. 2 is a flow chart of another access control method in a user equipment according to an implementation of the present disclosure.

FIG. 2 is a flow chart of another access control method in a user equipment according to an implementation of the present disclosure. As illustrated in FIG. 2, the access control method includes step S210, step S220 and step S230.

At step S210, the UE receives configuration information related to DRB. A plurality of logical channels related to the DRB include a first logical channel and a second logical channel. The configuration information includes first indication information indicating a first logical channel ID. The second logical channel ID is not included in the indication information. Wherein, an example of the indication information may be the cell primaryPath.

At step S220, the UE receives a MAC CE indicating an activation/deactivation of a PDCP duplication function of the DRB.

At step S230, when the MAC CE indicates the deactivation of the PDCP duplication function; for the first logical channel, in addition to using the serving cell which is allowed to be used and configured to the first logical channel, the logical channel also use the serving cell which is allowed to be used and configured to the second logical channel.

Accordingly, unlike the present mechanisms that when the PDCP duplication is deactivated the logical channel is directly allowed to use all serving cells, the above-disclosed access control method introduces indication information in the configuration information, wherein the indication information includes a logical channel ID of a plurality logical channels related to the DRB. When the PDCP duplication is deactivated, for the logical channel, in addition to using the serving cell which is allowed to be used and configured to the logical channel, the logical channel also uses other serving cells which IDs are not included in the configuration information and are allowed to be used.

Therefore, according to the above-disclosed access control method, the activation and deactivation of PDCP duplication and the activation and deactivation of serving cell restrictions may be flexibly controlled.

Figure 3:
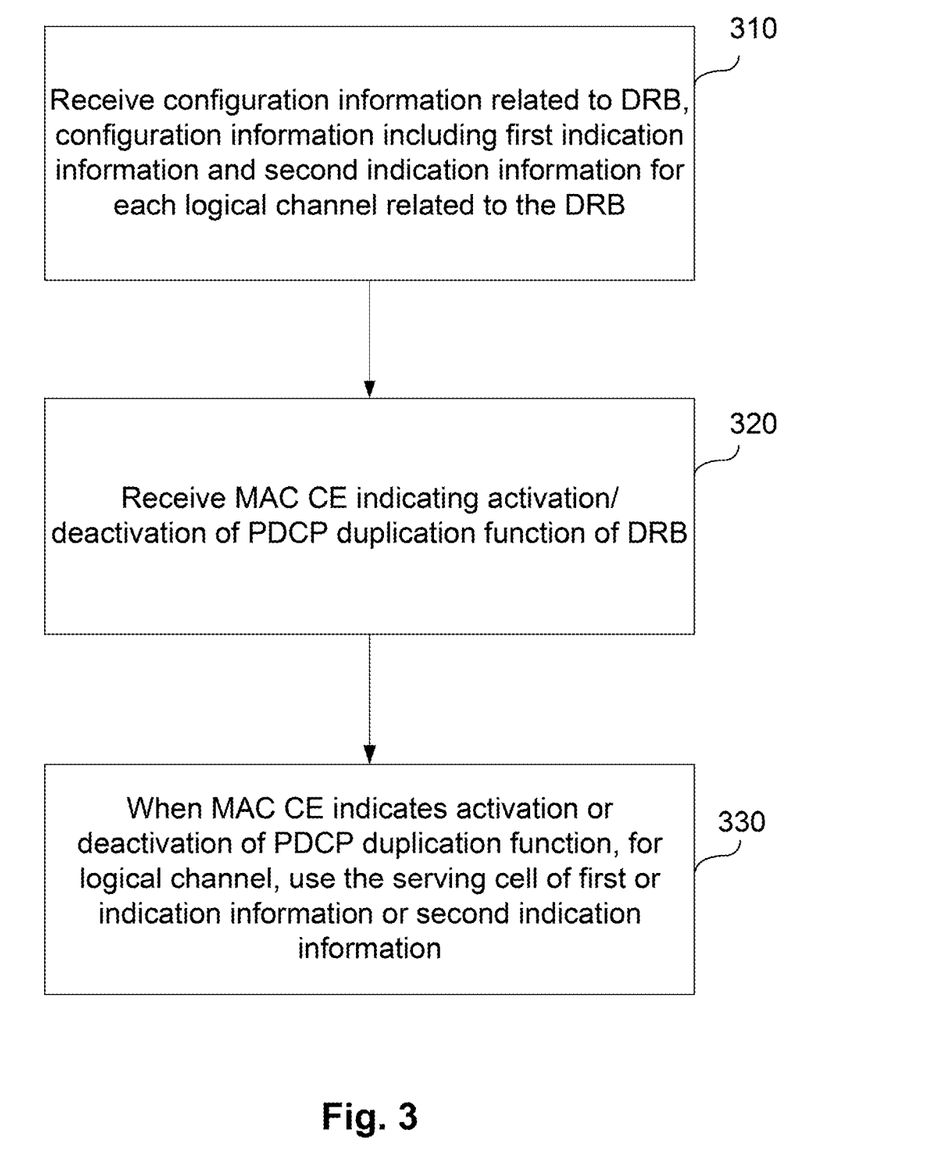
FIG. 3 is a flow chart of another access control method in a user equipment according to an implementation of the present disclosure.

FIG. 3 is a flow chart of another access control method in a user equipment according to an implementation of the present disclosure. As illustrated in FIG. 3, the access control method includes step S310, step S320 and step S330.

At step S310, the UE: receives configuration information related to DRB. The configuration information includes first indication information and second indication information for each logical channel related to the DRB. Wherein, the first indication information indicates the serving cell which is allowed to be used when a PDCP duplication function is activated. The second indication information indicates the serving cell which is allowed to be used when the PDCP duplication function is deactivated.

At step S320, the UE receives a MAC CE indicating the activation/deactivation of the PDCP duplication function of the DRB.

At step S330, when the MAC CE indicates the activation of the PDCP duplication function, the logical channel uses the serving cell of the first indication information. When the MAC CE indicates the deactivation of the PDCP duplication function, the logical channel uses the serving cell of the second indication information.

Accordingly, unlike the present mechanisms that when the PDCP duplication is deactivated the logical channel is directly allowed to use all serving cells, the above-disclosed access control method introduces first indication information and second indication information for each logical channel related to the DRB in the configuration information. The first indication information indicates the serving cell which is allowed to be used when the PDCP duplication function is activated. The second indication information indicates the serving cell which is allowed to be used when the PDCP duplication function is deactivated. When the PDCP duplication function is activated or deactivated, the above-disclosed access control method determines the serving cell for the logical channel according to the first indication information or the second indication information respectively.

Therefore, according to the above-disclosed access control method, the activation and deactivation of PDCP duplication and the activation and deactivation of serving cell restrictions may be flexibly controlled.

Figure 4:
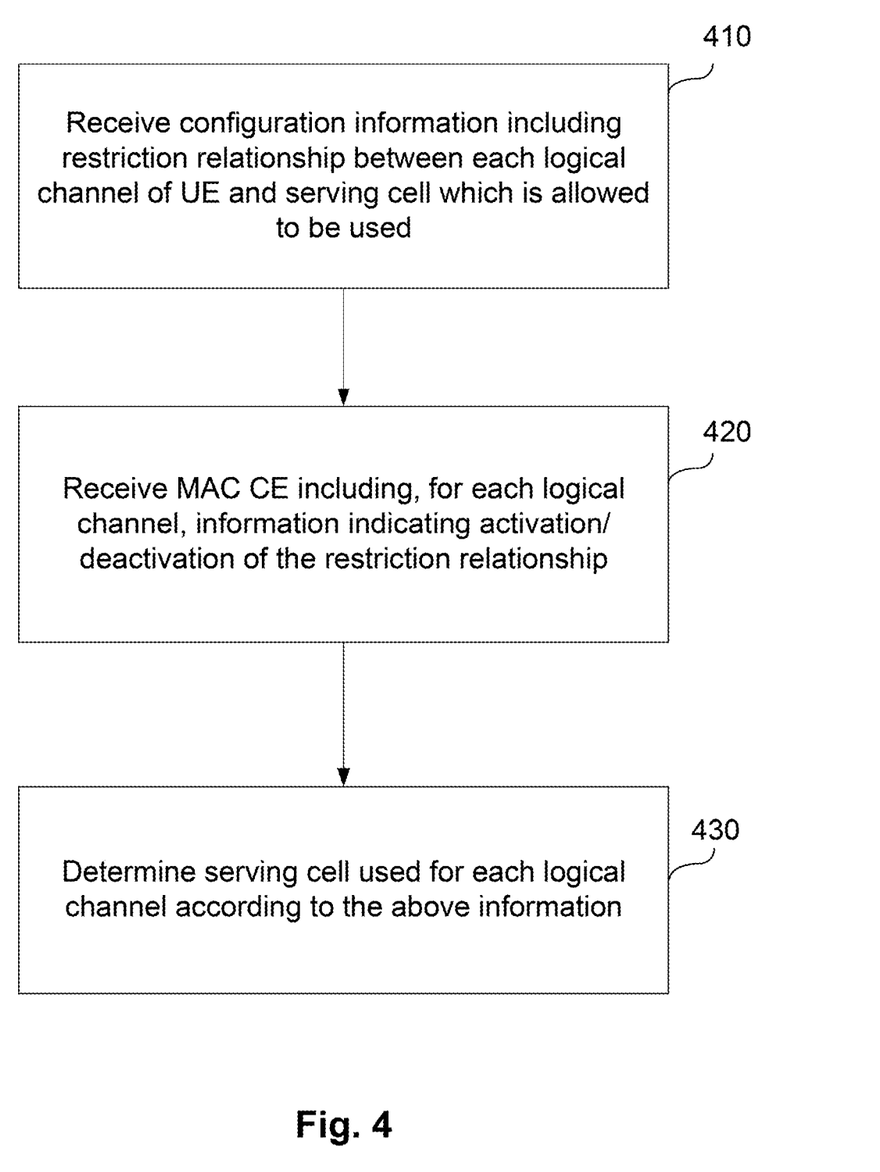
FIG. 4 is a flow chart of another access control method in a user equipment according to an implementation of the present disclosure.

FIG. 4 is a flow chart of another access control method in a user equipment according to an implementation of the present disclosure. As illustrated in FIG. 4, the access control method includes step S410, step S420 and step S430.

At step S410, the UE receives configuration information, the configuration information including a restriction relationship between each logical channel of the UE and a serving cell which is allowed to be used.

At step S420, the UE receives a MAC CE, the MAC CE including, for each logical channel, information indicating an activation/deactivation of the restriction relationship.

At step S430, according to the above information, determines a serving cell used for each logical channel.

Accordingly, unlike the present mechanisms that when the PDCP duplication is deactivated the logical channel is directly allowed to use all serving cells, the above-disclosed access control method relates to the configuration information including a restriction relationship between each logical channel of the UE and a serving cell which is allowed to be used; the MAC CE including, for each logical channel, information indicating an activation/deactivation of the restriction relationship; and determining a serving cell used for each logical channel according to the information.

Therefore, according to the above-disclosed access control method, the activation and deactivation of PDCP duplication and the activation and deactivation of serving cell restrictions may be flexibly controlled.

The following discloses various implementations of the present disclosure in detail.

Implementation 1

The UE receives configuration information sent from the network side. The configuration information includes indication information, which may be represented by a cell, e.g., the cell allowedServingCellfordup. This cell may be included in a PDCP configuration corresponding to a DRB, or a RLC-BearerConfig corresponding to a DRB. This DRB, therefore, may be called a DRB corresponded to the cell allowedServingCellfordup.

When the cell allowedServingCellfordup is configured to be 1 or TRUE, if the PDCP duplication function of the corresponding DRB is deactivated, the logical channel of the corresponding DRB may continue using the serving cell as configured and is allowed to be used.

When the cell allowedServingCellfordup is configured to be 0 or FALSE, if the PDCP duplication function of the corresponding DRB is deactivated, the logical channel of the corresponding DRB does not use the serving cell as configured and is allowed to be used. In another word, the logical channel of the corresponding DRB may use any serving cells, and not restricted by the serving cell restriction.

The network side may deactivate the DRB duplication function by sending a MAC CE. The network side may also activate the DRB duplication function by sending a reconfiguration information. In this implementation, when the UE receives a MAC CE for deactivating duplication function of some DRB, the value of allowedServingCellfordup needs to be determined, or whether the UE is configured with allowedServingCellfordup is determined.

The phrase "configured with allowedServingCellfordup" disclosed above refers to the cell is present in the corresponding configuration information. The phrase "not configured with allowedServingCellfordup" refers to the cell is absent in the configuration information.

if allowedServingCellfordup is configured to be 1 or TRUE, or the UE is configured with allowedServingCellfordup, then the UE, for the DRB or the corresponding logical channel of the DRB, continues using the serving cell as configured and is allowed to be used. Optionally, the UE indicates to a higher layer that the PDCP duplication function is deactivated.

Since there are at least two corresponding logical channels of the DRB, preferably, the UE may use the serving cell as configured and is allowed to be used for the logical channel corresponding to the primaryPath, and not use the serving cell as configured and is allowed to be used for the logical channel that is not corresponding to the primaryPath. Since it is in the condition that the duplication is deactivated, the UE always use the logical channel corresponding to the primaryPath for transmission, and does not use the logical channel that is not corresponding to the primaryPath.

if allowedServingCellfordup is configured to be 0 or FALSE, or the UE is not configured with allowedServingCellfordup, then the UE, for the DRB or the corresponding logical channel of the DRB, does not use the serving cell as configured and is allowed to be used. Optionally, the UE indicates to a higher layer that the PDCP duplication function is deactivated.

When the cell allowedServingCellfordup is included in the PDCP configuration corresponding to a DRB, the UE may perform the above operations.

When the cell allowedServingCellfordup is included in the RLC-BearerConfig corresponding to a DRB, since there are at least two RLC-BearerConfig corresponding to the DRB configured with PDCP duplication, each RLC-BearerConfig corresponds to a respective logical channel, then the logical channel corresponding to the DRB is controlled by respective allowedServingCellfordup.

For example, for the logical channel corresponding to the primaryPath, or for one of the logical channels:
  if allowedServingCellfordup is configured to be 1 or TRUE, or the UE is configured with allowedServingCellfordup, then the UE, for the DRB, continues using the serving cell as configured and is allowed to be used;
  if allowedServingCellfordup is configured to be 0 or FALSE, or the UE is not configured with allowedServingCellfordup, then the UE, for the DRB, does not use the serving cell as configured and is allowed to be used.

For the logical channel not corresponding to the primaryPath, or for one of the logical channels: —if allowedServingCellfordup is configured to be 1 or TRUE, or the UE is configured with allowedServingCellfordup, then the UE, for the DRB, continues using the serving cell as configured and is allowed to be used;
  if allowedServingCellfordup is configured to be 0 or FALSE, or the UE is not configured with allowedServingCellfordup, then the UE, for the DRB, does not use the serving cell as configured and is allowed to be used.

Implementation 2

When the UE receives the MAC CE indicating the PDCP duplication function of a DRB is deactivated, the UE implements the serving cell, which is not corresponding to the primaryPath and allowed to be used, on the logical channel corresponding to the primaryPath.

For example, one DRB of the UE is configured with the PDCP duplication function, the logical channel corresponding to the primaryPath is Logical Channel 1, the logical channel not corresponding to the primaryPath is Logical Channel 2. Both Logical Channel 1 and Logical Channel 2 correspond to the DRB.

The serving cells that are configured for and allowed to be used by Logical Channel 1 have cell IDs being Cell-1, Cell-2 respectively. The serving cells that are configured for and allowed to be used by Logical Channel 2 have cell IDs being Cell-3, Cell-4 respectively.

When the UE receives the MAC CE indicating the PDCP duplication function of a DRB is deactivated, the serving cells that Logical Channel 1 is allowed to use include Cell-1, Cell-2 as previously configured, and Cell-3, Cell-4 that are configured for and allowed to be used by Logical 2. In another word, when UE receives the above MAC CE, the serving cells that Logical Channel 1 is allowed to use include Cell-1, Cell-2, Cell-3 and Cell-4. Preferably, the UE indicates to a higher layer with the information related to the changes in serving cells of Logical Channel 1.

After the PDCP duplication function is deactivated, it may be considered that only the logical channel corresponding to the primaryPath is in operation. For Logical Channel 2, it may be considered that the serving cell as configured and is allowed to be used continues to be used, or the serving cell that is not configured and is allowed to be used is not used, even though all valid serving cells are usable.

After receiving the above deactivating MAC CE, the UE performs the above operations. If, in the subsequent operations, the UE receives the MAC CE indicating the activation of the PDCP duplication function of the DRB.

The cell from the serving cells allowed for Logical Channel 1 (allowedServingCells) resumes a previous configuration, which means the serving cells allowed for Logical Channel 1 are Cell-1, Cell-2.

The cell from the serving cells allowed for Logical Channel 2 (allowedServingCells) resumes a previous configuration, which means the serving cells allowed for Logical Channel 2 are Cell-3, Cell-4.

The above condition is the same as the condition prior to deactivation.

Implementation 3

This differs to Implementation 2 in that it introduces the indication information. The UE receives configuration information from the network side. The configuration information includes indication information, which may be represented by a cell, e.g., the cell allowedServingCellfordup. This cell may be included in a PDCP configuration corresponding to a DRB, or a RLC-BearerConfig corresponding to a DRB.

When the UE receives the MAC CE indicating the PDCP duplication function of a DRB is deactivated,
  if allowedServingCellfordup is configured to be 1 or TRUE, or the UE is configured with allowedServingCellfordup, the UE implements the serving cell, which is not corresponding to the primaryPath and allowed to be used, on the logical channel corresponding to the primaryPath. For the detailed implementation, please refer to Implementation 2.
  if allowedServingCellfordup is configured to be 0 or FALSE, or the UE is not configured with allowedServingCellfordup, then the UE, for the corresponding logical channel of the DRB, does not use the serving cell as configured and is allowed to be used. Optionally, the UE may, for the two logical channel corresponding to the DRB, not use the serving cell configured for the logical channels and allowed to be used. Furthermore, the UE may, for the logical channel corresponding to the primaryPath, not use the serving cell configured for the logical channel and allowed to be used; and, the UE may, for the logical channel not corresponding to the primaryPath, use the serving cell configured for the logical channel and allowed to be used.

Implementation 4

For each logical channel, the UE is configured with two types of cells that are allowed to be used for the logical channel. It can be understood as the UE is configured with cells that are allowed to be used for the logical channel under two conditions.

Wherein, when the first type of cells that are allowed to be used for the logical channel are used when the PDCP duplication is activated, and the second type of cells that are allowed to be used for the logical channel are used when the PDCP duplication is deactivated.

Example

For Logical Channel 1, the configuration information for the logical channel includes two cells allowedServingCellfordup and allowedServingCells.

Wherein,
the allowedServingCellfordup includes the cell IDs of Cell-1, Cell-2,
the allowedServingCells includes the cell ID of Cell-1.
When the PDCP publication is activated, the UE uses Cell-1, Cell-2 for Logical Channel 1 transmission;
when the PDCP publication is deactivated, the UE uses Cell-1 for Logical Channel 1 transmission.

For Logical Channel 2, the configuration information for the logical channel includes two cells allowedServingCellfordup and allowedServingCells.

Wherein, the allowedServingCellfordup includes the cell IDs of Cell-3, Cell-4, the allowedServingCells includes the cell ID of Cell-3.

When the PDCP publication is activated, the UE uses Cell-3, Cell-3 for Logical Channel 1 transmission;

when the PDCP publication is deactivated, the UE uses Cell-3 for Logical Channel 1 transmission.

Therefore, when the UE receives the MAC CE indicating the deactivation of PDCP duplication of a DRB, it uses the serving cell included/configured in the allowedServingCells for the logical channel corresponding to the DRB;

when the UE receives the MAC CE indicating the deactivation of PDCP duplication of a DRB, or receives information including RRC configuring PDCP duplication, it uses the serving cell included/configured in the allowedServingCellfordup for the logical channel corresponding to the DRB.

Particularly, when the logical channel corresponding to a DRB is only configured with the allowedServingCells, and the content indicated by the allowedServingCellsfordup is null or there is no configured allowedServingCellsfordup, the UE, when the PDCP duplication is activated, uses the cell configured in the allowedServingCells for transmission of the corresponding logical channel. When the PDCP duplication is deactivated, the UE continues using the cell configured in the allowedServingCells for transmission of the corresponding logical channel; or, combining with Implementation 1, the configuration information of the network side indicates whether to use the cell configured in the allowedServingCells for transmission on the corresponding logical channel or not to use any cell restrictions for transmission of the corresponding logical channel.

When the logical channel corresponding to a DRB is only configured with the allowedServingCellsfordup, and the content indicated by the allowedServingCells is null or there is no configured allowedServingCells, the UE, when the PDCP duplication is activated, uses the cell configured in the allowedServingCellsfordup for transmission of the corresponding logical channel. When the PDCP duplication is deactivated, the UE does not use the serving cell restrictions for transmission of the corresponding logical channel, which means the transmission of the logical channel may be performed on any valid serving cells.

Implementation 5

In present technology, when a PDCP duplication of a DRB is deactivated, the allowedServingCells configured for the logical channel corresponding to the DRB will not be activated, and the logical channel corresponding to the DRB may transmit on all serving cells. For flexibly activate or deactivate the serving cells configured for logical channel and allowed to be used, or to activate or deactivate the restriction function of the serving cell corresponding to the logical channel, a new MAC CE may be implemented.

The MAC CE includes a bitmap. The bitmap is constructed with several bits, each bit corresponds to a logical channel that is configured with a serving cell which is allowed to be use.

when the bit is 1, it represents the transmission relating to the logical channel can only be performed on the serving cell that is configured and allowed to be used. It may also represent the restriction relationship between the logical channel and the serving cell is activated or initiated;

when the bit is 0, it represents the transmission relating to the logical channel may be performed on all serving cells. It may also represent the restriction relationship between the logical channel and the serving cell is deactivated or released.

For each bit and logical channel to have a one-to-one relationship, the logical channels that are configured with serving cells may be sorted by the logical channel IDs in an ascending or descending order.

In an example with ascending order, the first bit from the left to the right of the bitmap corresponds to a logical channel configured with serving cell with the smallest logical channel ID. The second bit from the left of the bitmap corresponds to a logical channel configured with serving cell with the second smallest logical channel ID. Accordingly, the right-most bit of the bitmap corresponds to a logical channel configured with serving cell with the largest logical channel ID.

For example, the bitmap has a length of 8 bits.

TABLE 0001

| L1 | L2 | L3 | L4 | L5 | L6 | L7 | L8 |
|----|----|----|----|----|----|----|----|

If there are 5 logical channels among the logical channels in UE are configured with serving cells, and the logical channel IDs are 2, 4, 5, 7, 8, respectively; then, L1 corresponds to the logical channel with the logical channel ID being 2. When the value of L1 is 0, it represents that the logical channel with the logical channel ID being 2 does not use the serving cell as configured, which means the channel may use all serving cells. When the value of L1 is 1, it represents that the logical channel with the logical channel ID being 2 uses the serving cell as configured.

L2 corresponds to the logical channel with the logical channel ID being 4. When the value of L2 is 0, it represents that the logical channel with the logical channel ID being 4 does not use the serving cell as configured, which means the channel may use all serving cells. When the value of L2 is 1, it represents that the logical channel with the logical channel ID being 4 uses the serving cell as configured.

L3 corresponds to the logical channel with the logical channel ID being 5. When the value of L3 is 0, it represents that the logical channel with the logical channel ID being 5 does not use the serving cell as configured, which means the channel may use all serving cells. When the value of L3 is 1, it represents that the logical channel with the logical channel ID being 5 uses the serving cell as configured.

L4 corresponds to the logical channel with the logical channel ID being 7. When the value of L4 is 0, it represents that the logical channel with the logical channel ID being 7 does not use the serving cell as configured, which means the channel may use all serving cells. When the value of L4 is 1, it represents that the logical channel with the logical channel ID being 7 uses the serving cell as configured.

L5 corresponds to the logical channel with the logical channel ID being 8. When the value of L5 is 0, it represents that the logical channel with the logical channel ID being 8 does not use the serving cell as configured, which means the channel may use all serving cells. When the value of L5 is 1, it represents that the logical channel with the logical channel ID being 8 uses the serving cell as configured.

L6-L8 are reserved bits, which the UE may ignore.

If there are 8 logical channels among the logical channels in UE are configured with serving cells, the bitmap will extend to, in this example, 16 bits, which takes two bytes.

Particularly, in order to individually manage the logical channel corresponding to the DRB that is configured with PDCP duplication, the logical channel configured with serving cell disclosed in the present implementation may not include the logical channels corresponding to the DRB that is configured with PDCP duplication. Whether these logical channels use the serving cells as configured may be determined by combining the methods disclosed in Implementations 1-4.

Implementation 6

Implementation 6 is different to Implementation 5 in that each bit in the bitmap corresponds to a DRB or a DRB ID.

When the DRB is not configured with a PDCP duplication, there is usually only one RLC entity, and only one RLC-BearerConfig is associated with the DRB. Therefore, the DRB ID and the logical channel ID included in the RLC-BearerConfig may be corresponded in a one-to-one relationship.

A MAC CE may be designed, so that each bit in the bitmap included in the MAC CE corresponds to a DRB corresponding to the logical channel that is configured with serving cell which is allowed to be used (or each bit corresponds to respective serving cell DRB). The specific corresponding method may be similar to Implementation 5, with the logical ID replaced with DRB ID.

When the UE receives the MAC CE, if the MAC CE deactivates/disables the serving cell restriction function of the DRB that is configured with the serving cell restriction, then the UE indicates to a higher layer that the serving cell that is configured to the corresponding DRB and is allowed to be used is deactivated/disabled (may also be called the serving cell restriction being cancelled). Or, the UE indicates to a higher layer to not use the serving cell configuration of the serving cell that is configured to the corresponding DRB and is allowed to be used (may also indicates to a higher layer to cancel the serving cell restriction of the DRB, or indicates that the serving cell restriction of the logical channel corresponding to the DRB is cancelled). Optionally, the serving cell configuration of the logical channel corresponding to the DRB is not used.

When the UE receives the MAC CE, if the MAC CE activates/enables the serving cell configured for the logical channel corresponding to a DRB and is allowed to be used (also called activates/enables the serving cell restriction function of the DRB or the logical channel corresponding to the DRB), then the UE indicates to a higher layer that the serving cell configuration of the logical channel corresponding to the DRB is deactivated/disabled (may be called indicates to a higher layer the activation/enabling of the serving cell configured for a DRB). Or, the UE indicates to a higher layer to use the serving cell configuration of the logical channel corresponding to the DRB is used (may be called indicates to a higher layer to use the serving cell configured to the DRB). Optionally, the serving cell configuration of the logical channel corresponding to the DRB is used (may be called the serving cell configured for the DRB is used).

The DRB configured with the PDCP duplication disclosed herein may not be included in the DRB that the bitmap corresponds to, as this type of DRB includes at least two logical channels.

Particularly, the DRB configured with the PDCP duplication may be included, since the DRB configured with the PDCP duplication includes two logical channel, in the MAC CE disclosed in this implementation, the serving cell with activated or deactivated configuration that is allowed to be used only corresponds to the logical channel of the primaryPath.

Accordingly, when the UE receives the MAC CE as disclosed in this implementation, the DRB corresponded to one of the bits in the bitmap of the MAC CE is configured with the PDCP duplication, then the bit value is configured to be 0. The UE indicates to a higher layer the deactivation/disabling of the serving cell configuration of the logical channel corresponding to the DRB and the primaryPath. Alternatively, the UE indicates to a higher layer not to use of the serving cell configuration of the logical channel corresponding to the DRB and the primaryPath; optionally, the UE does not use the serving cell configuration of the logical channel corresponding to the DRB and the primaryPath.

Accordingly, when the UE receives the MAC CE as disclosed in this implementation, the DRB corresponded to one of the bits in the bitmap of the MAC CE is configured with the PDCP duplication, then the bit value is configured to be 1. The UE indicates to a higher layer the activation/enabling of the serving cell configuration of the logical channel corresponding to the DRB and the primaryPath. Alternatively, the UE indicates to a higher layer to use of the serving cell configuration of the logical channel corresponding to the DRB and the primaryPath; optionally, the UE uses the serving cell configuration of the logical channel corresponding to the DRB and the primaryPath.

Implementation 7

A MAC CE is designed, the MAC CE may be used to activate/enable or deactivate/disable the relationship between the PDCP duplication and the serving cell.

The MAC CE includes a bitmap. Each bit in the bitmap corresponds to a DRB configured with PDCP duplication, or a DRB configured with a serving cell restriction.

The DRB IDs corresponded to the DRB are sorted in an ascending order or a descending order, and the DRB IDs correspond to each bit of the bitmap from the left to the right or from the left to the right. For the detailed implementation, please refer to Implementation 5.

When a bit is 0, if the corresponding DRB is configured with PDCP duplication, then when the UE receives the MAC CE, the UE indicates to a higher layer to deactivate PDCP duplication function, and, optionally, not use the restriction function between logical channel and serving cell for the DRB or for the logical channel corresponding to the DRB.

When a bit is 0, if the corresponding DRB is configured with PDCP duplication and the PDCP duplication has been deactivated, then when the UE receives the MAC CE, the UE indicates to a higher layer to not use the restriction function between logical channel and serving cell for the DRB or for the logical channel corresponding to the DRB.

When a bit is 0, if the corresponding DRB is not configured with PDCP duplication but configured with the restriction relationship between logical channel and serving cell, then when the UE receives the MAC CE, the UE indicates to a higher layer to not use the restriction function between logical channel and serving cell for the DRB or for the logical channel corresponding to the DRB.

When a bit is 1, if the corresponding DRB is configured with PDCP duplication, then when the UE receives the MAC CE, the UE indicates to a higher layer to activate/enable PDCP duplication function, and, optionally, use the restriction function between logical channel and serving cell for the DRB or for the logical channel corresponding to the DRB.

When a bit is 1, if the corresponding DRB is configured with PDCP duplication and the PDCP duplication has been activated, then when the UE receives the MAC CE, the UE ignores the information or continue activating the PDCP duplication.

When a bit is 1, if the corresponding DRB is not configured with PDCP duplication but configured with the restriction relationship between logical channel and serving cell, then when the UE receives the MAC CE, the UE indicates to a higher layer to use the restriction function between logical channel and serving cell for the DRB or for the logical channel corresponding to the DRB.

Figure 5:
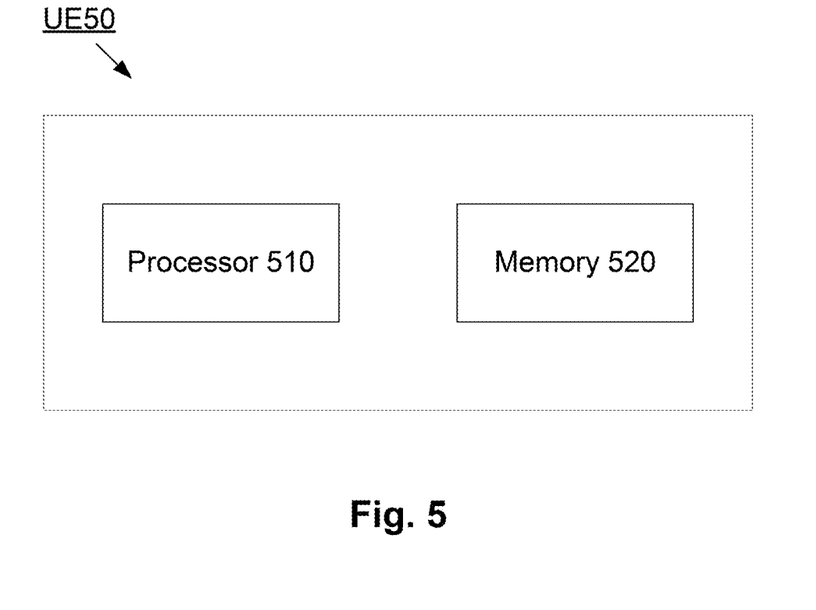
FIG. 5 is a block diagram of a user equipment according to an implementation of the present disclosure.

FIG. 5 is a block diagram of a user equipment 50 according to an implementation of the present disclosure. As shown in FIG. 5, the user equipment 50 comprises a processor 510 and a memory 520. The processor 510, in one example, may comprise a microprocessor, a microcontroller, an embedded processor etc. The memory 520, in one example, may comprise volatile memory (e.g., random access memory RAM), a hard disk drive (HDD), non-volatile memory (e.g., flash memory), or any other memories. The memory 520 stores program instructions. The program instructions, when executed by the processor 510, cause the base station to carry out the access control methods as disclosed herein.

According to the present disclosure, executing programs stored on equipment may be implemented by controlling a Central Processor Unit (CPU) and causing a computer to realize the program functions of the present disclosure. The program or the information being processed by the program may be stored in volatile memory (e.g., random access memory (RAM)), a hard disk drive (HDD), non-volatile memory (e.g., flash memory), or any other suitable memory system.

The program that realizes functions of each implementation in the present disclosure may be stored on a computer-readable medium. Computer systems through reading the programs stored in the storage medium executes the programs to realize the corresponding functions. The "computer system" disclosed herein may be a computer system embedded in equipment, may include an operating system or hardware (e.g., peripheral equipment). A "computer-readable medium" may be a semiconductor storage medium, optical storage medium, a magnetic storage medium, a storage medium for short-term dynamic storing of programs, or any other storage medium readable by a computer.

Various characteristics or function modules used in the equipment disclosed in the implementations herein may be realized or implemented by electronics such as a monolithic or multiple-chip integrated circuit. The electronics designed for implementing the functions disclosed herein may include general processors, a digital signal processor (DSP), Applications Specific Integrated Circuitry (ASIC), Field Programmable Gate Arrays (FPGAs) or any other programmable logic devices, discrete gate or transistor logic, discrete hardware assembly, or any combination of the disclosed devices. A general processor may be a microprocessor, or any present processor, controller, microcontroller, or state machine. The disclosed electronics may be digital electronics or analog electronics. As semiconductor technology continues to improve, it is noted that there may be new integrated circuit technology replacing present integrated circuits, one or more implementations of the present disclosure may be implemented with the new integrated circuit technology.

Moreover, the present disclosure is not limited to the disclosed implementations. Although various examples are disclosed in each implementation, it should be noted that the present disclosure is not limited thereto. Fixed or non-mobile electronic equipment installed indoor or outdoor may be in a form of terminal equipment or communications equipment. For example, the electronic equipment may be Audio-Video equipment, kitchen equipment, cleaning equipment, air-conditioner, office equipment, vending machines, and other home appliances etc.

As above, the implementations of the present disclosure are disclosed in detail with reference to the accompanying drawings. However, the implementations are not limited to the disclosed implementations. The present disclosure also includes design variations without departing from the scope or spirit of the disclosed concepts. Furthermore, the present disclosure also encompasses modifications within the scope of the claims, implementations suitably combining various disclosed implementations. Additionally, the disclosed implementations may have component substitutions that have similar effect.

What is claimed is:

1. An access control method in a user equipment (UE), the method comprising: receiving configuration information related to data radio bearer (DRB); receiving a media access control element (MAC CE) indicating an activation/deactivation of a packet data convergence protocol layer (PDCP) duplication function of the DRB; when the MAC CE indicates the deactivation of the PDCP duplication function, determining whether the configuration information comprises indication information, the indication information indicating a restriction relationship between a logical channel associated with the DRB and a serving cell which is allowed to be used; and determining a serving cell used for the logical channel according to a result of the determination.

2. An access control method according to claim 1, wherein, when the result of the determination is that the configuration information includes the indication information, for the logical channel, use the serving cell which is allowed to be used and configured to the logical channel; when the result of the determination is that the configuration information does not include the indication information, for the logical channel, do not use the serving cell which is allowed to be used and configured to the logical channel.

3. An access control method according to claim 1, wherein, when the result of the determination is that the configuration information includes the indication information, determine the serving cell used for the logical channel according to a value of the indication information.

4. An access control method according to claim 1, wherein, the logical channel associated with the DRB include a plurality of logical channels, for each logical channel, determining a serving cell used for the logical channel according to the result of the determination.

5. An access control method in a user equipment (UE), the method comprising: receiving configuration information related to data radio bearer (DRB); a plurality of logical channels related to the DRB including a first logical channel and a second logical channel, the configuration information including first indication information indicating a first logical channel ID, receiving a media access control element (MAC CE) indicating an activation/deactivation of a packet data convergence protocol layer (PDCP) duplication function of the DRB, and when the MAC CE indicates the deactivation of the PDCP duplication function; for the first logical channel, in addition to using the serving cell which is allowed to be used and configured to the first logical channel, also using the serving cell which is allowed to be used and configured to the second logical channel.

6. An access control method according to claim 5, the method further comprising: when receiving the MAC CE indicating the activation of the PDCP duplication function, for the first logical channel, using the serving cell which is allowed to be used and configured to the first logical channel.

7. An access control method according to claim 5, the method further comprising: determining whether the configuration information comprises second indication information, the second indication information indicating a restriction relationship between a logical channel associated with the DRB and a serving cell which is allowed to be used; when the MAC CE indicates the deactivation of the PDCP duplication function and a result of the determination is that the configuration information includes the second indication information, for the first logical channel, in addition to using the serving cell which is allowed to be used and configured to the first logical channel, also using the serving cell which is allowed to be used and configured to the second logical channel.

8. An access control method in a user equipment (UE), the method comprising: receiving configuration information related to data radio bearer (DRB), the configuration information including first indication information and second indication information for each logical channel related to the DRB, wherein the first indication information indicates the serving cell which is allowed to be used when a packet data convergence protocol layer (PDCP) duplication function is activated, the second indication information indicates the serving cell which is allowed to be used when the PDCP duplication function is deactivated; receiving a media access control element (MAC CE) indicating the activation/deactivation of the PDCP duplication function of the DRB; and when the MAC CE indicates the activation of the PDCP duplication function, for the logical channel, using the serving cell of the first indication information; when the MAC CE indicates the deactivation of the PDCP duplication function, for the logical channel, using the serving cell of the second indication information.

9. An access control method in a user equipment (UE), the method comprising: receiving configuration information, the configuration information including a restriction relationship between each logical channel of the UE and a serving cell which is allowed to be used; receiving a media access control element (MAC CE), the MAC CE including, for each logical channel, information indicating an activation/deactivation of the restriction relationship; and determining a serving cell used for each logical channel according to the information.

10. A user equipment, comprising: a processor; and a memory storing instructions; wherein, the instructions, when executed by the processor, performs an access control method according to any one of claims 1 to 9.

* * * * *